(12) United States Patent
Liu (10) Patent No.: US 9,927,091 B2
(45) Date of Patent: Mar. 27, 2018

(54) SPOTLIGHT AND CONVERGING LENS

(71) Applicant: Young Lighting Technology Inc., Hsin-Chu (TW)

(72) Inventor: Hung-Wei Liu, Hsin-Chu (TW)

(73) Assignee: Young Lighting Technology Inc., Hsin-Chu (TW)

( * ) Notice: Subject to any disclaimer, the term of this patent is extended or adjusted under 35 U.S.C. 154(b) by 0 days.

(21) Appl. No.: 15/473,590

(22) Filed: Mar. 29, 2017

(65) Prior Publication Data

US 2017/0307172 A1    Oct. 26, 2017

(30) Foreign Application Priority Data

Apr. 26, 2016    (CN) .......................... 2016 1 0264359

(51) Int. Cl.
| | |
|---|---|
| *F21V 5/00* | (2018.01) |
| *F21V 5/04* | (2006.01) |
| *G02B 3/00* | (2006.01) |
| *F21W 131/405* | (2006.01) |
| *F21Y 115/10* | (2016.01) |

(52) U.S. Cl.
CPC .............. *F21V 5/048* (2013.01); *F21V 5/045* (2013.01); *G02B 3/00* (2013.01); *F21W 2131/405* (2013.01); *F21Y 2115/10* (2016.08)

(58) Field of Classification Search
CPC . F21V 5/048; F21V 5/045; G02B 3/00; F21Y 2115/10
See application file for complete search history.

(56) References Cited

U.S. PATENT DOCUMENTS

| | | | |
|---|---|---|---|
| 9,640,741 B1* | 5/2017 | Lin ........................ | H01L 33/58 |
| 2014/0036510 A1 | 2/2014 | Preston et al. | |
| 2014/0247604 A1 | 9/2014 | Tang et al. | |
| 2016/0076739 A1* | 3/2016 | Hsiao ..................... | F21V 5/048 |
| | | | 362/299 |

FOREIGN PATENT DOCUMENTS

TW    I512337    12/2015

* cited by examiner

*Primary Examiner* — Evan Dzierzynski
(74) *Attorney, Agent, or Firm* — JCIPRNet (57) ABSTRACT

A spotlight and a converging lens are provided. The converging lens has a light-emitting surface and a light incidence surface. An outer diameter of the converging lens is progressively decreased from the light-emitting surface toward the light incidence surface. The light-emitting surface has an opening. A maximum distance between the light incidence surface and the light-emitting surface along a thickness direction of the converging lens is H1, a maximum distance between a bottom surface of the opening and the light incidence surface along the thickness direction is H2, and 0.3×H1≤H2≤0.5×H1. The light incidence surface has at least one annular groove. The at least one annular groove has a central axis. The converging lens of the invention may converge light beam and mitigate a light spill phenomenon, and the spotlight applying the converging lens has good lighting quality.

20 Claims, 11 Drawing Sheets

SPOTLIGHT AND CONVERGING LENS

CROSS-REFERENCE TO RELATED APPLICATION

This application claims the priority benefit of China application serial no. 201610264359.9, filed on Apr. 26, 2016. The entirety of the above-mentioned patent application is hereby incorporated by reference herein and made a part of this specification.

BACKGROUND OF THE INVENTION

Field of the Invention

The invention relates to a lamp and an optical device, and particularly relates to a spotlight and a converging lens.

Description of Related Art

Commercial lighting generally adopts spotlights to irradiate exhibition articles to highlight the exhibition articles, for example, clothing, jewels, or paintings, etc. The spotlight generally adopts a high-brightness lamp, which, for example, includes a plurality of light-emitting devices in collaboration with a lens array. Since a light-emitting angle of the spotlight is small, the irradiated object may have multiple shadows under irradiation of a plurality of light-emitting devices. In case of a plurality of irradiated objects, the lighting environment may seem confusing due to mutual overlapping of multiple shadows, which may cause a negative influence on overall lighting quality.

Figure 1:
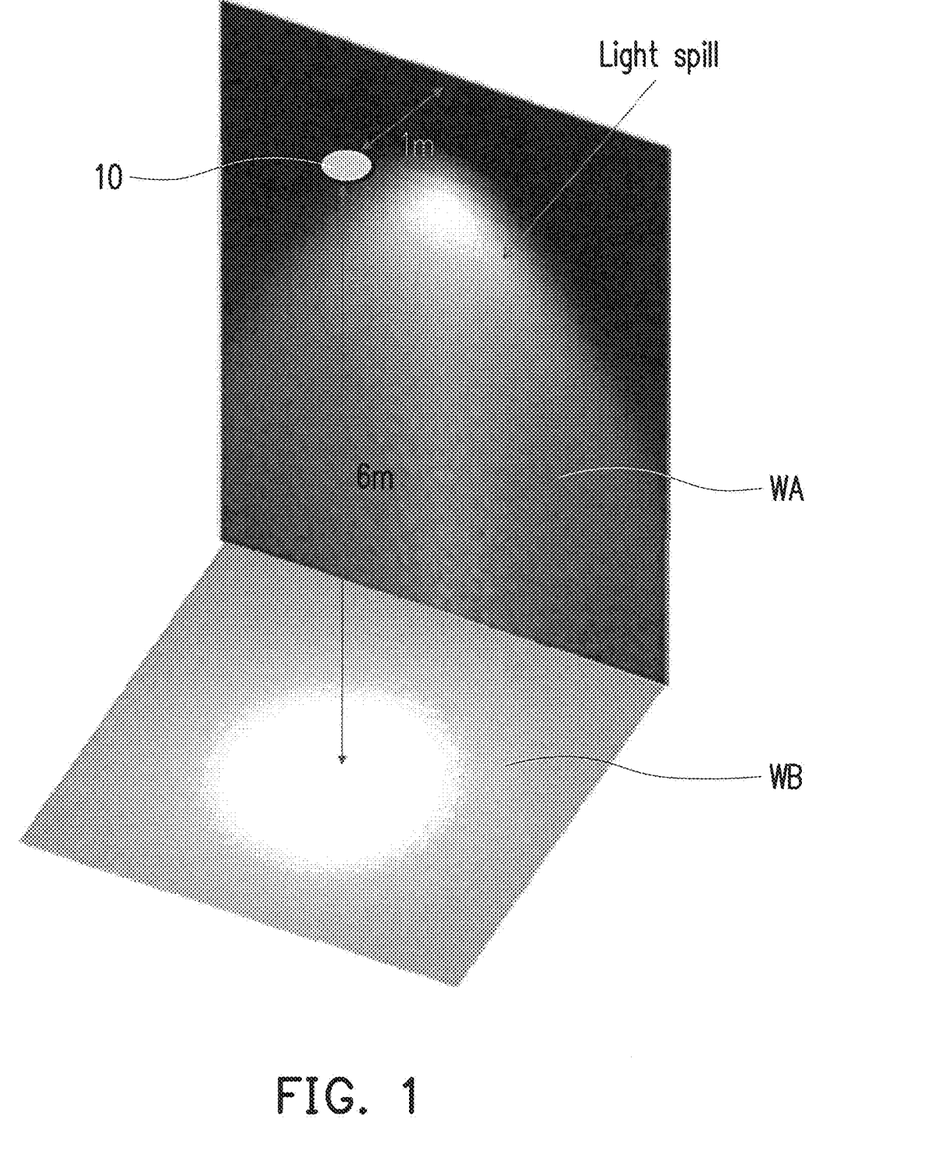
FIG. 1 is a lighting simulation diagram of a known spotlight.

Current spotlight in the market adopts a design of a single light-emitting device in collaboration with a single lens or a single reflection cover to resolve the aforementioned ghost image phenomenon. However, such design still cannot mitigate a light spill phenomenon. FIG. 1 is a lighting simulation diagram of a known spotlight. Referring to FIG. 1, a distance between the spotlight 10 and a wall WA is, for example, 1 meter, and a distance between the spotlight 10 and the ground WB is, for example, 6 meters, the light spill is mainly a fan-shaped bright pattern formed on an object (for example, the wall WA) located adjacent to the spotlight 10 by a large angle light beam emitted by the spotlight 10. Since the light spill may influence the lighting quality, how to balance the light converging effect and mitigate the light spill phenomenon has become an important problem to be resolved by related technicians of the field.

The information disclosed in this "BACKGROUND OF THE INVENTION" section is only for enhancement of understanding of the background of the described technology and therefore it may contain information that does not form the prior art that is already known to a person of ordinary skill in the art. Further, the information disclosed in the "BACKGROUND OF THE INVENTION" section does not mean that one or more problems to be resolved by one or more embodiments of the invention was acknowledged by a person of ordinary skill in the art.

SUMMARY OF THE INVENTION

The invention is directed to a spotlight, which has good lighting quality.

The invention is directed to a converging lens, which is adapted to converge light and mitigate the light spill phenomenon.

Other objects and advantages of the invention may be further illustrated by the technical features broadly embodied and described as follows.

In order to achieve at least one or a portion of or all of the objects or other objects, an embodiment of the invention provides a spotlight including a light-emitting device and a converging lens. The converging lens is disposed beside the light-emitting device and has a light-emitting surface and a light incidence surface. The light incidence surface is located between the light-emitting surface and the light-emitting device. An outer diameter of the converging lens is progressively decreased from the light-emitting surface toward the light incidence surface. The light-emitting surface has an opening. A maximum distance between the light incidence surface and the light-emitting surface along a thickness direction of the converging lens is H1, a maximum distance between a bottom surface of the opening and the light incidence surface along the thickness direction is H2, and $0.3 \times H1 \leq H2 \leq 0.5 \times H1$. The light incidence surface has at least one annular groove. The at least one annular groove and the light-emitting device have a same central axis.

In order to achieve at least one or a portion of or all of the objects or other objects, an embodiment of the invention provides a converging lens having a light-emitting surface and a light incidence surface. An outer diameter of the converging lens is progressively decreased from the light-emitting surface toward the light incidence surface. The light-emitting surface has an opening. A maximum distance between the light incidence surface and the light-emitting surface along a thickness direction of the converging lens is H1, a maximum distance between a bottom surface of the opening and the light incidence surface along the thickness direction is H2, and $0.3 \times H1 \leq H2 \leq 0.5 \times H1$. The light incidence surface has at least one annular groove. The at least one annular groove has a central axis.

According to the above description, the spotlight and the converging lens of embodiments of the invention have at least one of the following advantages or effects. Since the outer diameter of the converging lens is progressively decreased from the light-emitting surface toward the light incidence surface, and the light-emitting surface has an opening, the converging lens may effectively converge light. Moreover, since the annular groove of the light incidence surface may change a propagating direction of the light beam, energy of the large angle light beam emitted from the converging lens is effectively decreased, so that the converging lens may mitigate the light spill phenomenon. Moreover, the spotlight of embodiment of the invention applying the aforementioned converging lens may have good lighting quality.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 2A:
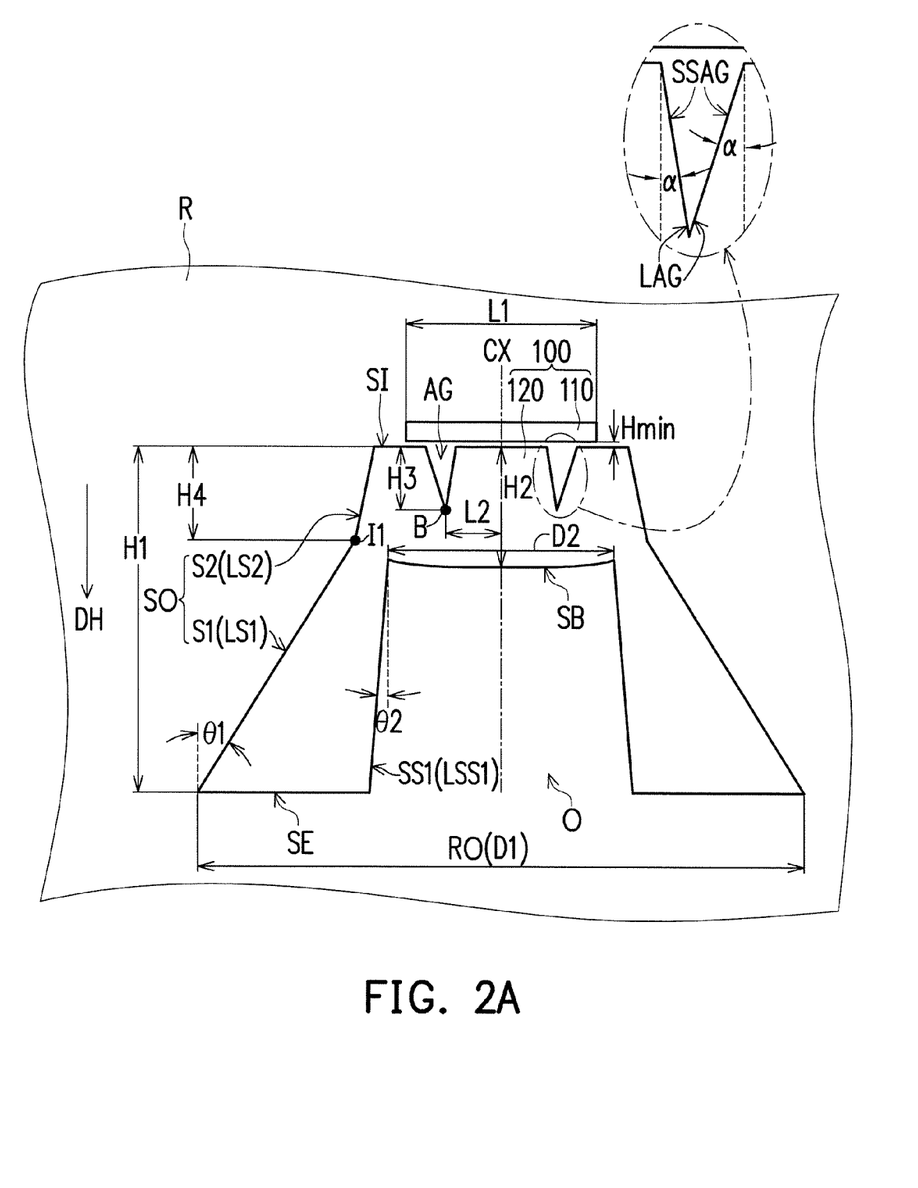
FIG. 2A is a cross-sectional view of a spotlight according to a first embodiment of the invention.
Figure 2B:
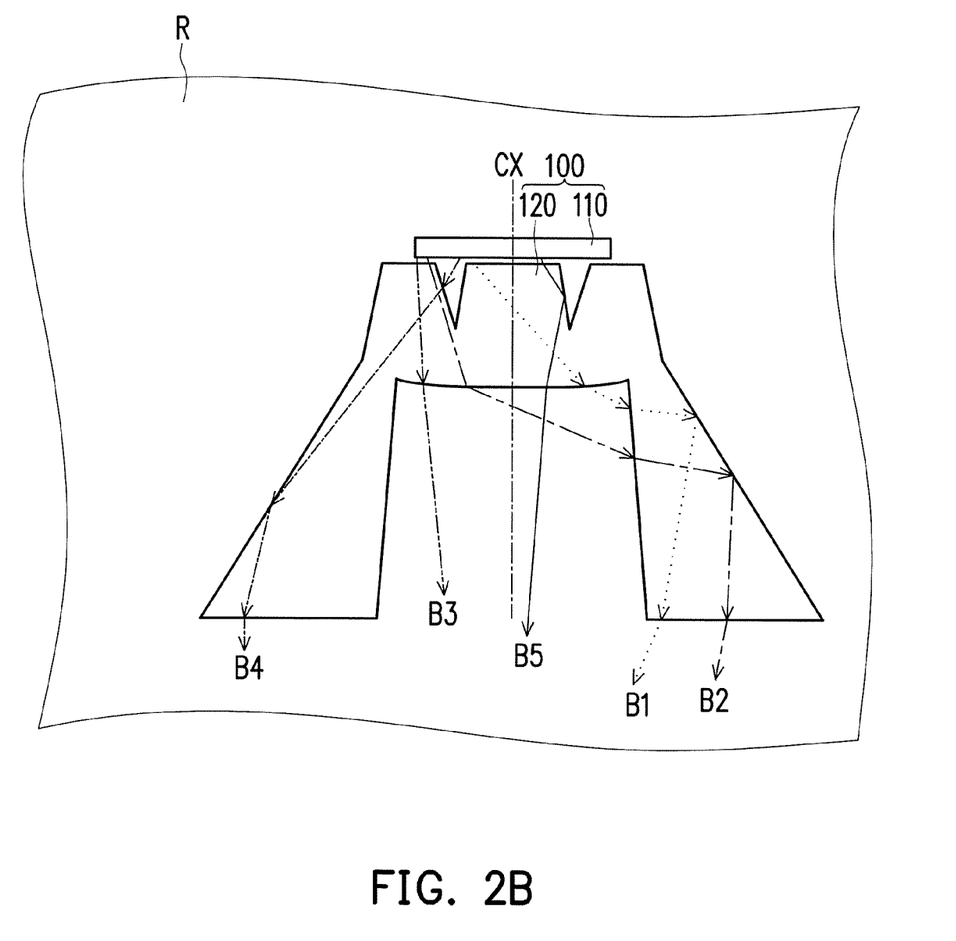
FIG. 2B is a schematic diagram of optical paths of a converging lens of FIG. 2A.
Figure 2C:
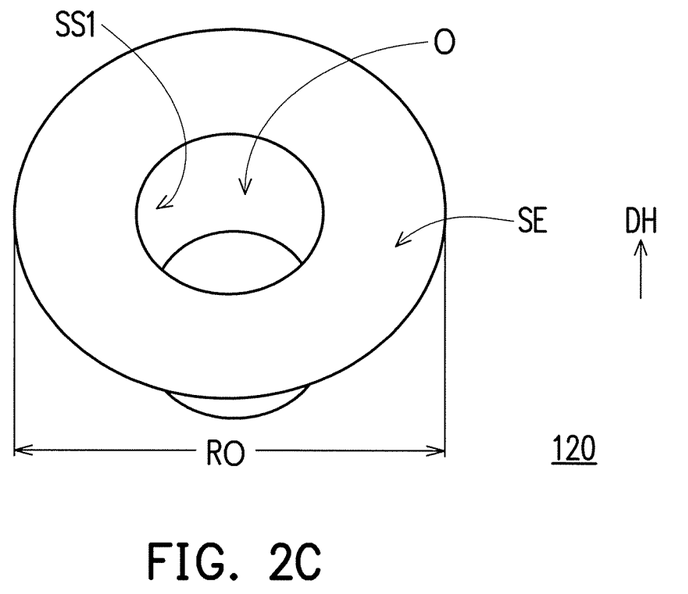
FIG. 2C and FIG. 2D are respectively a bottom view and a top view of the converging lens of FIG. 2A.
Figure 2D:
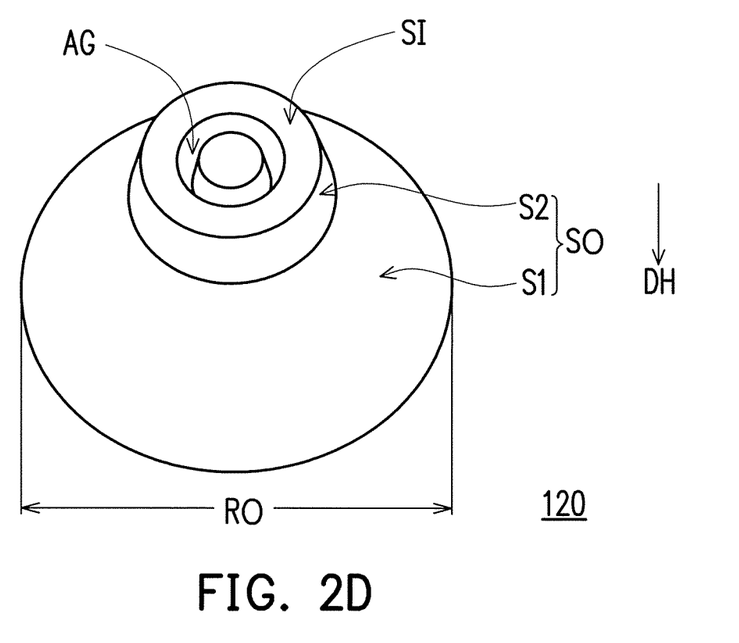
Figure 2E:
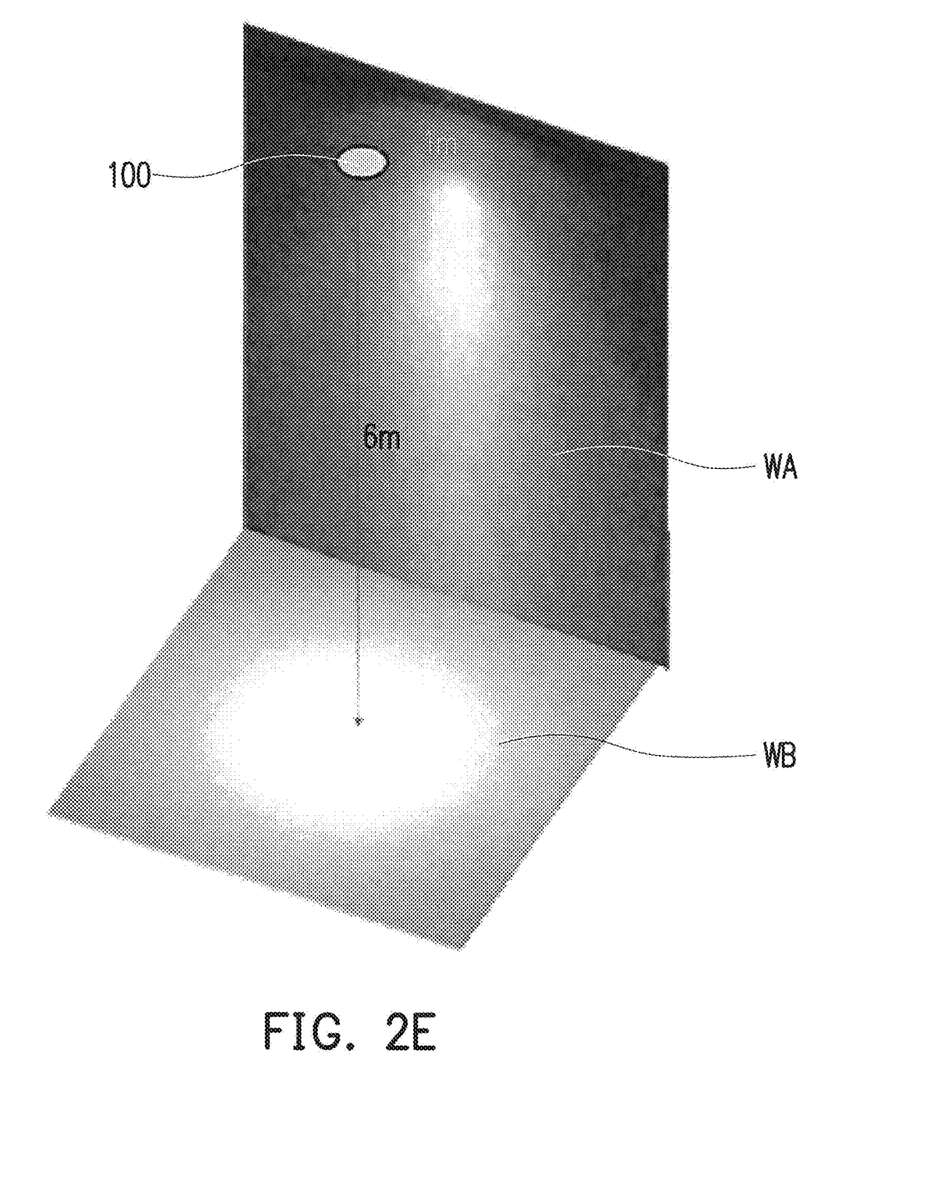
FIG. 2E is a lighting simulation diagram of the converging lens of FIG. 2A.
Figure 2F:
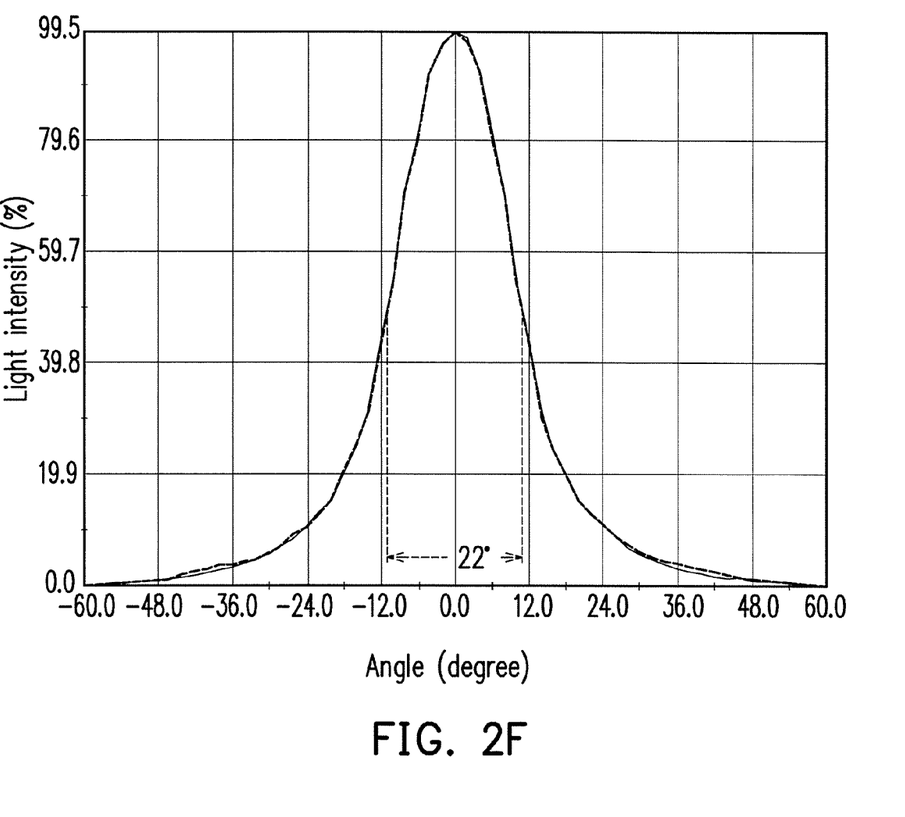
FIG. 2F is a diagram of a light intensity-angle curve of the converging lens of FIG. 2A.

FIG. 2A is a cross-sectional view of a spotlight according to a first embodiment of the invention. FIG. 2B is a schematic diagram of optical paths of a converging lens of FIG. 2A. FIG. 2C and FIG. 2D are respectively a bottom view and a top view of the converging lens of FIG. 2A. FIG. 2E is a lighting simulation diagram of the converging lens of FIG. 2A. FIG. 2F is a diagram of a light intensity-angle curve of the converging lens of FIG. 2A.

Referring to FIG. 2A to FIG. 2D, a spotlight 100 includes a light-emitting device 110 and a converging lens 120. The light-emitting device 110 is adapted to provide a light beam for illumination. For example, the light-emitting device 110 may be a light-emitting diode (LED), though the invention is not limited thereto. The converging lens 120 is disposed beside the light-emitting device 110, and is used for converging the light beam coming from the light-emitting device 110. For example, a material of the converging lens 120 includes glass or plastic, though the invention is not limited thereto.

The converging lens 120 has a light-emitting surface SE and a light incidence surface SI and an outer surface SO, where the light incidence surface SI is located between the light-emitting surface SE and the light-emitting device 110, and the outer surface SO is connected to the light-emitting surface SE and the light incidence surface SI. In the embodiment, the light-emitting surface SE and the light incidence surface SI are, for example, respectively planes parallel to a light-emitting region (not shown) of the light-emitting device 110, and the outer surface SO includes a first surface S1 and a second surface S2. The first surface S is connected to the light-emitting surface SE and the second surface S2. The second surface S2 is connected to the first surface S1 and the light incidence surface SI. Section lines LS1 and LS2 of the first surface S1 and the second surface S2 on a reference plane R parallel to a thickness direction DH of the converging lens 120 are respectively oblique lines. However, the invention is not limited thereto. According to different design requirements, at least one of the light-emitting surface SE and the light incidence surface SI may be a curved surface protruding or recessing relative to the light-emitting region of the light-emitting device 110, or at least one of the light-emitting surface SE and the light incidence surface SI may be an inclined surface inclined relative to the light-emitting region of the light-emitting device 110. Moreover, the outer surface SO may be a single curved surface or composed of a plurality of surfaces (inclined surface or curved surface) with the number greater than 2, and a section line of the outer surface SO on the reference plane R may be an oblique line or an arc line.

An outer diameter RO of the converging lens 120 is progressively decreased from the light-emitting surface SE toward the light incidence surface SI (or the outer diameter RO is progressively increased from the light incidence surface SI toward the light-emitting surface SE along the thickness direction DH). The light-emitting surface SE has an opening O, where the opening O has a bottom surface SB and a first side surface SS1 connected to the bottom surface SB. In the embodiment, the bottom surface SB is a curved surface protruding toward the light-emitting surface SE, and the first side surface SS1 is connected to the light-emitting surface SE and the bottom surface SB, though the invention is not limited thereto. A maximum distance between the light incidence surface SI and the light-emitting surface SE along the thickness direction DH of the converging lens 120 is H1, a maximum distance between the bottom surface SB of the opening O and the light incidence surface SI along the thickness direction DH is H2, and $0.3 \times H1 \leq H2 \leq 0.5 \times H1$. The light incidence surface SI has at least one annular groove AG. The at least one annular groove AG and the light-emitting device 110 have a same central axis CX.

Since the outer diameter RO is progressively decreased from the light-emitting surface SE toward the light incidence surface SI, a large angle light beam entering the converging lens 120 may be reflected (for example, total internal reflection) by the outer surface SO, and is propagated to the central axis CX or to be parallel to the central axis CX (referring to light beams B1 and B2 of FIG. 2B). Moreover, a small angle light beam entering the converging lens 120 is refracted to emit out from the opening O of the light-emitting surface SE, and is propagated to the central axis CX or to be parallel to the central axis CX (referring to a light beam B3 of FIG. 2B). Therefore, by forming the opening O on the light-emitting surface SE, and by adjusting a depth of the opening O, for example, adjusting the maximum distance H1 and the maximum distance H2 to satisfy $0.3 \times H1 \leq H2 \leq 0.5 \times H1$, an emitting angle of the light beam emitted from the converging lens 120 is adjusted, so as to achieve a light converging effect (referring to the light beams B1, B2 and B3 of FIG. 2B). According to the above design, by satisfying $0.3 \times H1 \leq H2 \leq 0.5 \times H1$, a converging angle (an angle corresponding to light intensity of 50%) of the converging lens 120 may be converged to about 22 degrees (referring to FIG. 2F). Moreover, since the annular groove AG of the light incidence surface SI may reflect or refract the light beam to change a propagating direction of the light beam for propagating the same to the central axis CX or to be parallel to the central axis CX (referring to light beams B4 and B5 of FIG. 2B), light energy of the light beam emitted from the converging lens 120 in the large angle may be effectively decreased, such that the converging lens 120 mitigates the light spill phenomenon, and accordingly the spotlight 100 applying the converging lens 120 may have good lighting quality. As shown in FIG. 2E, a distance between the spotlight 100 and a wall WA is, for example, 1 meter, and a distance between the spotlight 100 and a ground WB is, for example, 6 meters, a light intensity distribution on the wall WA near the spotlight 100 is relatively even, and compared to FIG. 1, the light spill phenomenon is obviously mitigated.

In the embodiment, an amount of the at least one annular groove AG is one, where a diameter of the light-emitting region of the light-emitting device 110 is L1, a minimum distance between a bottom B of the annular groove AG and the central axis CX is L2, and $0.2 \times L1 \leq L2 \leq 0.3 \times L1$. Specifically, if the minimum distance L2 is smaller than $0.2 \times L1$, the annular groove AG is too close to the central axis CX, and the light beam received by the annular groove AG is a small angle light beam, after the small angle light beam is refracted or reflected by the annular groove AG, an original propagating direction (for example, an original propagating direction of the light beam B3 of FIG. 2B) thereof is changed, and the light beam is propagated to deviate from the central axis CX (not shown), such that the light converging effect may not be achieved. On the other hand, a large angle light beam may not be incident to the annular groove AG, and is directly emitted out of the converging lens 120 without being subjected to a function (for example, the total internal reflection) of the outer surface SO, so that the light spill phenomenon still exists. Moreover, if the minimum distance L2 is greater than $0.3 \times L1$, the annular groove AG is too close to the outer surface SO, and a part of the large angle light beams may not be incident to the annular groove AG, and is directly emitted out of the converging lens 120 without being subjected to the function (for example, the total internal reflection) of the outer surface SO, so that the light spill phenomenon still exists. Moreover, a maximum depth of the annular groove AG along the thickness direction DH is H3, and $0.05 \times H2 \leq H3 \leq 0.5 \times H2$. Specifically, if the maximum depth H3 is smaller than $0.05 \times H2$, the depth of the annular groove AG is not deep enough, and may not adjust a propagating direction of the large angle light beam; and if the maximum depth H3 is greater than $0.5 \times H2$, the depth of the annular groove AG is too deep, which may cause breaking of the converging lens 120, and the propagating direction of the large angle light beam is excessively adjusted to cause uneven light intensity distribution. Therefore, according to the above design, by satisfying $0.2 \times L1 \leq L2 \leq 0.3 \times L1$ and $0.05 \times H2 \leq H3 \leq 0.5 \times H2$, a proportion that the large angle light beam incident to the converging lens 120 is directly emitted out of the converging lens 120 without being subjected to the function (for example, the total internal reflection) of the outer surface SO is decreased, and a structural strength of the converging lens 120 is kept while the light spill phenomenon is suppressed. Moreover, an included angle between the central axis CX and a section line LAG of at least one side surface SSAG of the annular groove AG on the reference plane R parallel to the thickness direction DH is $\alpha$, and $0° \leq \alpha \leq 20°$. Based on the design of the included angle $\alpha$ of the side surface SSAG, the large angle light beam may be refracted or reflected for propagating to the central axis CX or to be parallel to the central axis CX (referring to the light beams B4 and B5 of FIG. 2B). Moreover, it is also conducive to small-size implementation. However, the amount, the shape and the included angle $\alpha$ of the annular groove AG may be changed according to an actual requirement, and are not limited to the implementation of FIG. 2A. The amount of the annular grooves may also be plural. For example, a sectional shape of the annular groove AG on the reference plane R is not limited to the V-shape shown in FIG. 2A. In another embodiment, the sectional shape of the annular groove AG on the reference plane R may also be a U-shape, though the invention is not limited thereto.

According to different design requirements, the shape and the parameter of each of the surfaces of the converging lens 120 may be further designed. For example, the first surface S and the second surface S2 have a first intersection I1. A maximum distance between the first intersection I1 and the light incidence surface SI along the thickness direction DH is H4, and $H4 \leq H2$. In this way, besides that the converging lens 120 has an ideal converging effect, it also has an optimal structural strength, though the invention is not limited thereto.

Moreover, a minimum distance Hmin between the light incidence surface SI and the light-emitting device 110 along the thickness direction DH of the converging lens 120 is smaller than or equal to 1 mm, such that most of the light beams (for example, the light beams B1, B2, B3, B4 and B5 that are not normally incident to the converging lens 120) may enter the converging lens 120 via refraction at the light incidence surface SI, so as to achieve the converging effect.

Moreover, an outer diameter of the light-emitting surface SE is D1, the diameter of the light-emitting region of the light-emitting device 110 is L1, and D1:H1:L1=3.5:2:1. An inner diameter of the bottom surface SB of the opening O is D2, and D2>L1 to cover a propagating range of the light beam coming from the light-emitting region of the light-emitting device 110. An included angle between the central axis CX and a tangent line (in the embodiment, the section line LS1 is an oblique line, so that the tangent line of the section line LS1 is the section line LS1) of the section line LS1 is $\theta 1$, and $30° < \theta 1 < 40°$. An included angle between the central axis CX and a section line LSS1 of the first side surface SS1 on the reference plane R is $\theta 2$, and $0° \leq \theta 2 < 10°$. According to the above design, the converging angle (the angle corresponding to the light intensity of 50%) of the converging lens 120 may be converged to about 22 degrees (referring to FIG. 2F), though the invention is not limited thereto.

Figure 3:
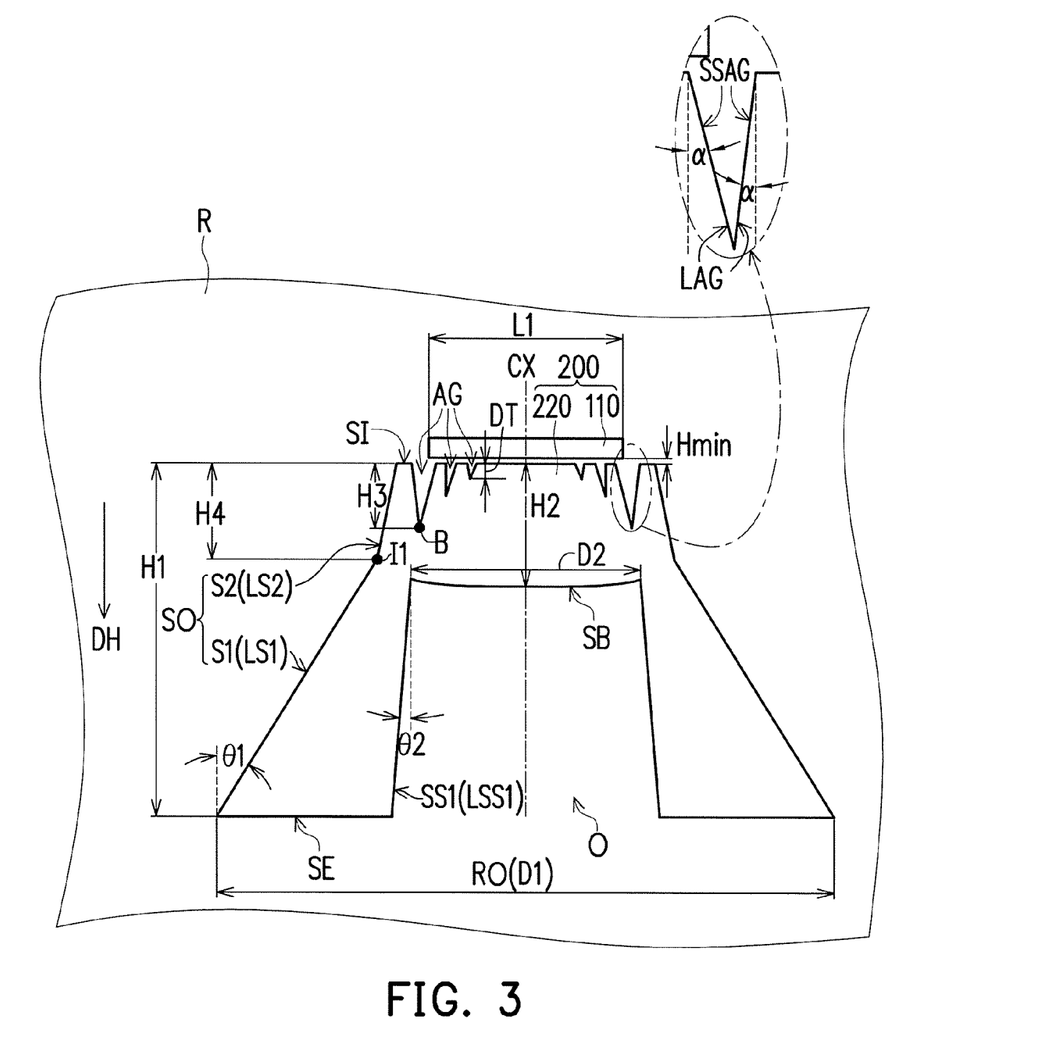
FIG. 3 is a cross-sectional view of a spotlight according to a second embodiment of the invention.
Figure 4:
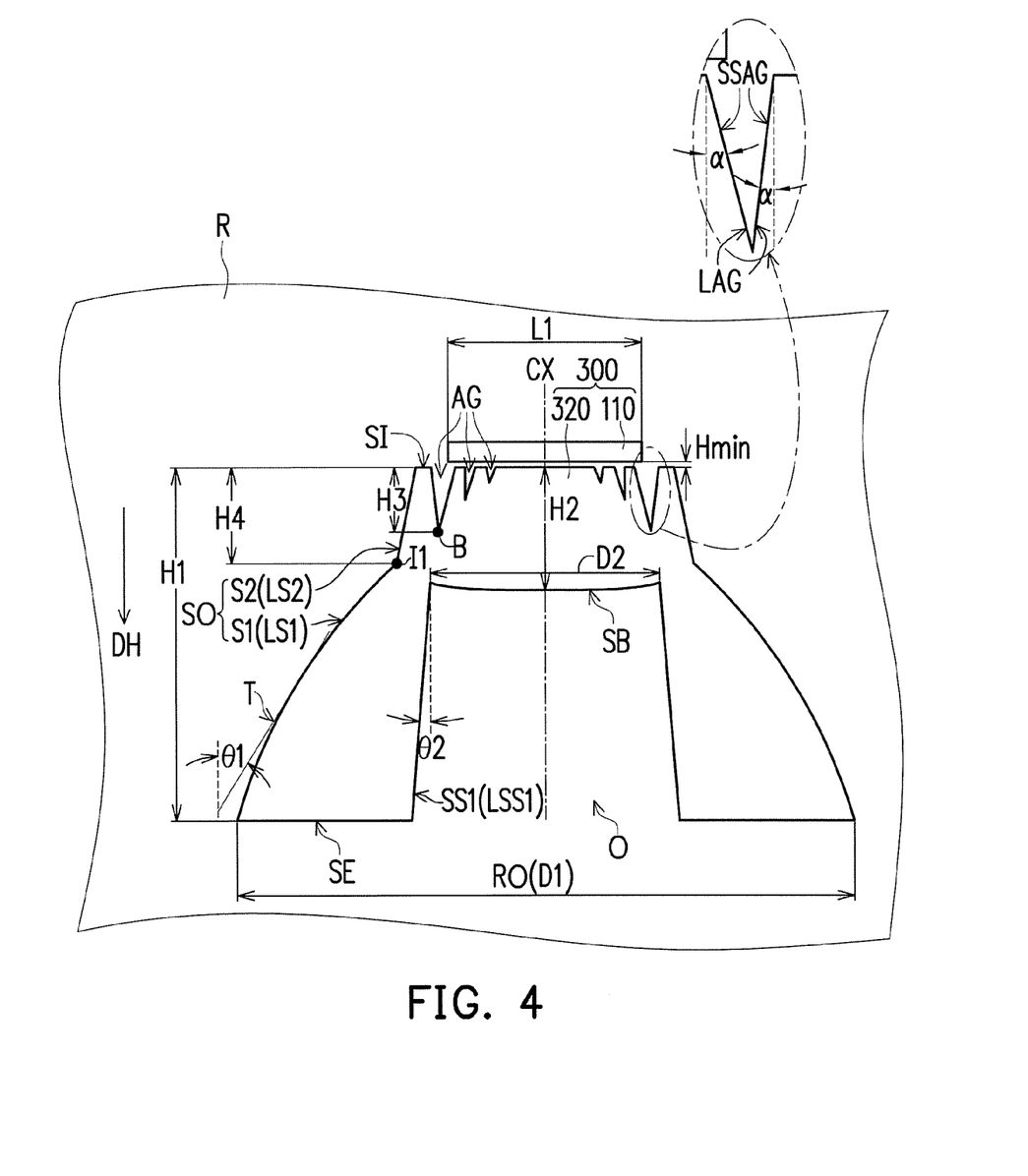
FIG. 4 is a cross-sectional view of a spotlight according to a third embodiment of the invention.

Other embodiments of the spotlights are described below with reference of FIG. 3 to FIG. 5C, where the same or similar devices are denoted by the same or similar referential numbers, and the spotlights of the embodiments of FIG. 3 to FIG. 5C have the same or similar material, parameter design, related configuration relationship or effects with that of the spotlight 100 of the embodiment of FIG. 2A, so that the material, the parameter design, the related configuration relationship or the effects of the spotlights are not repeated in the following description. FIG. 3 is a cross-sectional view of a spotlight according to a second embodiment of the invention. FIG. 4 is a cross-sectional view of a spotlight according to a third embodiment of the invention. FIG. 8A is a cross-sectional view of a spotlight according to a fourth embodiment of the invention. FIG. 5B is a schematic diagram of optical paths of a converging lens of FIG. 5A. FIG. 5C is a bottom view of the converging lens of FIG. 5A.

Referring to FIG. 3, the spotlight 200 is similar to the spotlight 100 of FIG. 2A, and a main difference therebetween is that in the spotlight 200, the light incidence surface SI of the converging lens 220 have a plurality of annular grooves AG. The annular grooves AG and the light-emitting device 110 have the same central axis CX, and depths DT of the annular grooves AG are, for example, progressively increased toward a direction away from the central axis CX, though the invention is not limited thereto.

Referring to FIG. 4, the spotlight 300 is similar to the spotlight 200 of FIG. 3, and a main difference therebetween is that in the spotlight 300, the section line LS1 of the first surface S1 of the outer surface SO of the converging lens 320 on the reference plane R is an arc line, and an included angle between the central axis CX and a tangent line T of the section line LS1 is θ1, and 30°<θ1<40°.

Figure 5A:
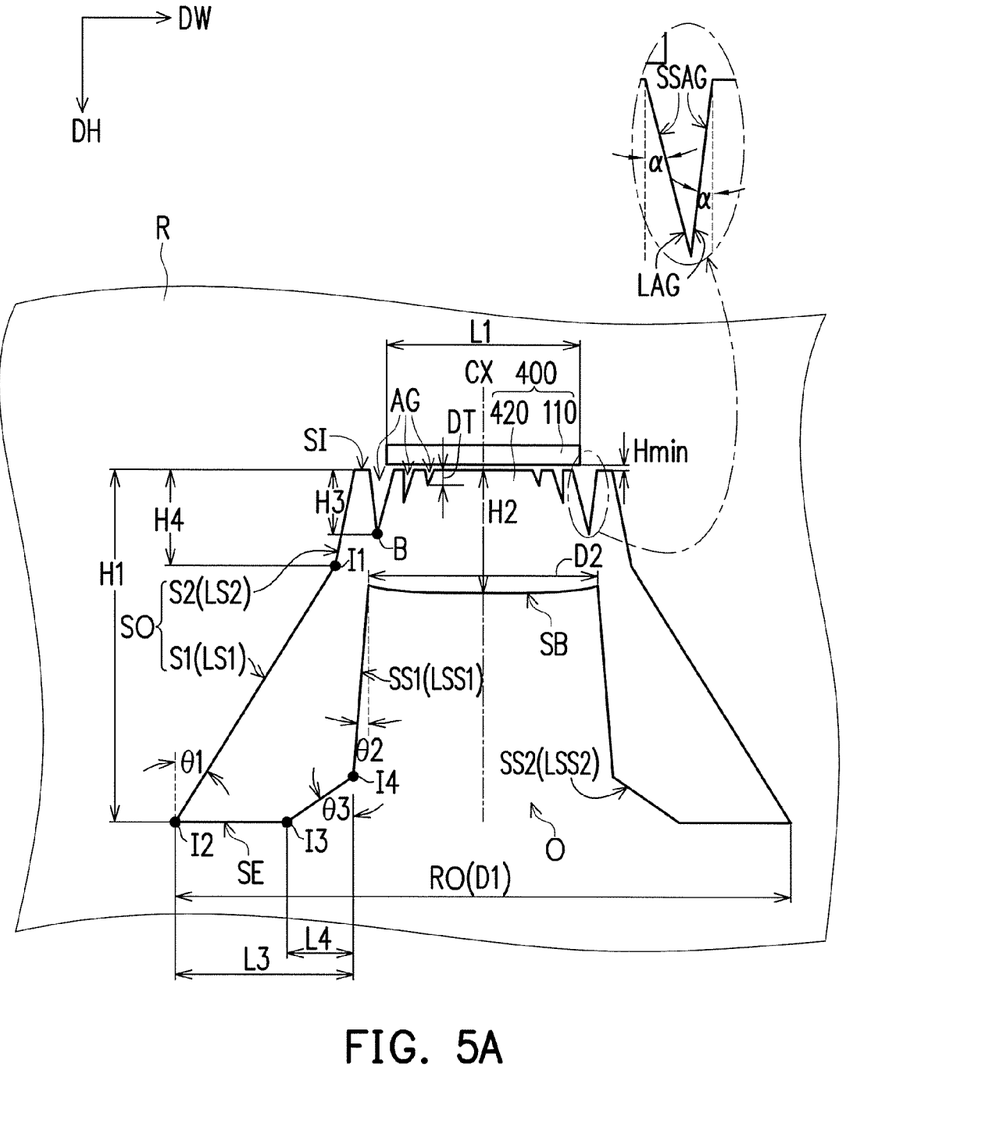
FIG. 5A is a cross-sectional view of a spotlight according to a fourth embodiment of the invention.
Figure 5B:
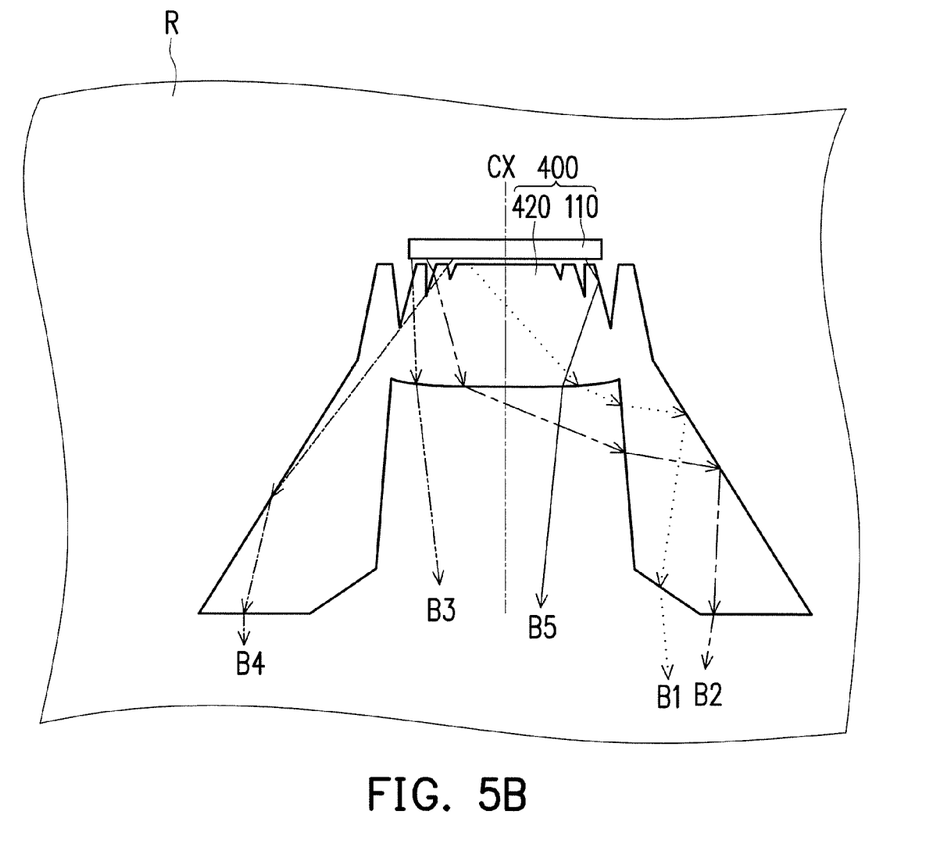
FIG. 5B is a schematic diagram of optical paths of a converging lens of FIG. 5A.
Figure 5C:
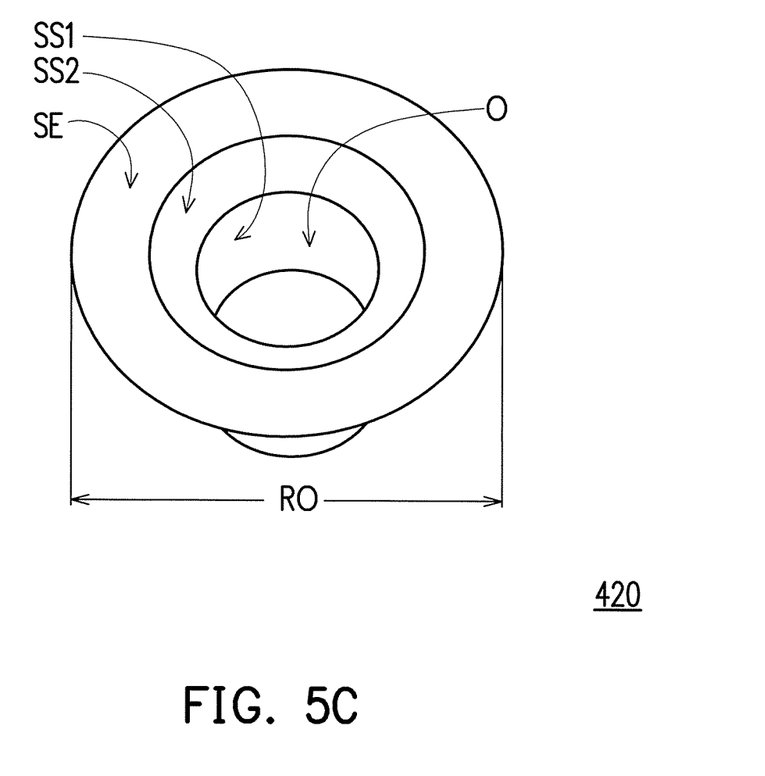
FIG. 5C is a bottom view of the converging lens of FIG. 5A.

Referring to FIG. 5A to FIG. 5C, the spotlight 400 is similar to the spotlight 200 of FIG. 3, and a main difference therebetween is that in the spotlight 400, the opening O of the light-emitting surface SE of the converging lens 420 further has a second side surface SS2, where the second side surface SS2 is connected to the light-emitting surface SE and the first side surface SS1, and the first side surface SS1 is connected to the second side surface SS2 and the bottom surface SB. An included angle between the central axis CX and a section line LSS2 of the second side surface SS2 on the reference plane R is θ3, and 30°≤θ3≤50°. Based on the design of the second side surface SS2 and the included angle θ3, an included angle between the central axis CX and the light beam B emitted out of the converging lens 420 from the second side surface SS2 may be decreased, so as to further mitigate the light spill phenomenon.

In the embodiment, the outer surface SO and the light-emitting surface SE have a second intersection 12. The light-emitting surface SE and the second side surface SS2 have a third intersection 13. The second side surface SS2 and the first side surface SS1 have a fourth intersection 14. A distance between the second intersection 12 and the fourth intersection 14 along a width direction DW perpendicular to the thickness direction DH is L3, a distance between the third intersection 13 and the fourth intersection 14 along the width direction DW is L4, and 0.3×L3≤L4≤0.45×L3. Specifically, if the distance L4 is smaller than 0.3×L3, the function of decreasing the included angle between the central axis CX and the light beam B1 emitted out of the converging lens 420 from the second side surface SS2 is relatively less, and if the distance L4 is greater than 0.45× L3, it may cause uneven light intensity distribution. Therefore, based on the above design, not only the light spill phenomenon is mitigated, but also a light-emitting brightness of the converging lens 420 is maintained.

In summary, the spotlight and the converging lens of embodiments of the invention have at least one of the following advantages or effects. Since the outer diameter of the converging lens is progressively decreased from the light-emitting surface toward the light incidence surface, and the light-emitting surface has an opening, the converging lens may effectively converge light. Moreover, since the annular groove of the light incidence surface may change a propagating direction of the light beam, energy of the large angle light beam emitted from the converging lens is effectively decreased, so that the converging lens may mitigate the light spill phenomenon. Moreover, the spotlight of embodiment of the invention applying the aforementioned converging lens may have good lighting quality.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:
1. A spotlight, comprising:
   a light-emitting device; and
   a converging lens, disposed beside the light-emitting device, and having a light-emitting surface and a light incidence surface, the light incidence surface located between the light-emitting surface and the light-emitting device, wherein an outer diameter of the converging lens is progressively decreased from the light-emitting surface toward the light incidence surface, the light-emitting surface has an opening, a maximum distance between the light incidence surface and the light-emitting surface along a thickness direction of the converging lens is H1, a maximum distance between a bottom surface of the opening and the light incidence surface along the thickness direction is H2, and $0.3 \times H1 \leq H2 \leq 0.5 \times H1$, the light incidence surface has at least one annular groove, wherein the at least one annular groove and the light-emitting device have a same central axis.

2. The spotlight as claimed in claim 1, wherein a minimum distance between the light incidence surface and the light-emitting device along the thickness direction is smaller than or equal to 1 mm.

3. The spotlight as claimed in claim 1, wherein an outer diameter of the light-emitting surface is D1, a diameter of a light-emitting region of the light-emitting device is L1, and D1:H1:L1=3.5:2:1.

4. The spotlight as claimed in claim 3, wherein an inner diameter of the bottom surface of the opening is D2, and D2>L1.

5. The spotlight as claimed in claim 3, wherein an amount of the at least one annular groove is one, a minimum distance between a bottom of the annular groove and the central axis is L2, and $0.2 \times L1 \leq L2 \leq 0.3 \times L1$.

6. The spotlight as claimed in claim 1, wherein a maximum depth of the at least one annular groove is H3, and $0.05 \times H2 \leq H3 \leq 0.5 \times H2$.

7. The spotlight as claimed in claim 1, wherein an amount of the at least one annular groove is plural, an included angle between the central axis and a section line of at least one side surface of at least one of the annular grooves on a reference plane parallel to the thickness direction is α, and $0° \leq \alpha \leq 20°$.

8. The spotlight as claimed in claim 1, wherein the converting lens further has an outer surface connected to the light-emitting surface and the light incidence surface, the outer surface comprises a first surface and a second surface, the first surface is connected to the light-emitting surface and the second surface, the second surface is connected to the first surface and the light incidence surface, the first surface and the second surface have a first intersection, a maximum distance between the first intersection and the light incidence surface along the thickness direction is H4, and H4≤H2.

9. The spotlight as claimed in claim 8, wherein a section line of the first surface on a reference plane parallel to the thickness direction is an oblique line or an arc line, an included angle between the central axis and a tangent line of the section line is θ1, and $30° < \theta1 < 40°$.

10. The spotlight as claimed in claim 1, wherein the opening has a first side surface connected to the bottom surface, an included angle between the central axis and a section line of the first side surface on a reference plane parallel to the thickness direction is θ2, and $0° \leq \theta2 < 10°$.

11. The spotlight as claimed in claim 10, wherein the opening further has a second side surface, the second side surface is connected to the light-emitting surface and the first side surface, an included angle between the central axis and a section line of the second side surface on the reference plane is θ3, and $30° \leq \theta3 \leq 50°$.

12. The spotlight as claimed in claim 11, wherein the converging lens further has an outer surface connected to the light-emitting surface and the light incidence surface, the outer surface and the light-emitting surface have a second intersection, the light-emitting surface and the second side surface have a third intersection, the second side surface and the first side surface have a fourth intersection, a distance between the second intersection and the fourth intersection along a width direction perpendicular to the thickness direction is L3, a distance between the third intersection and the fourth intersection along the width direction is L4, and $0.3 \times L3 \leq L4 \leq 0.45 \times L3$.

13. A converging lens, comprising a light-emitting surface and a light incidence surface, wherein an outer diameter of the converging lens is progressively decreased from the light-emitting surface toward the light incidence surface, the light-emitting surface has an opening, a maximum distance between the light incidence surface and the light-emitting surface along a thickness direction of the converging lens is H1, a maximum distance between a bottom surface of the opening and the light incidence surface along the thickness direction is H2, and $0.3 \times H1 \leq H2 \leq 0.5 \times H1$, the light incidence surface has at least one annular groove, and the at least one annular groove has a central axis.

14. The converging lens as claimed in claim 13, wherein a maximum depth of the at least one annular groove is H3, and $0.05 \times H2 \leq H3 \leq 0.5 \times H2$.

15. The converging lens as claimed in claim 13, wherein an amount of the at least one annular groove is plural, an included angle between the central axis and a section line of at least one side surface of at least one of the annular grooves on a reference plane parallel to the thickness direction is α, and $0° \leq \alpha \leq 20°$.

16. The converging lens as claimed in claim 13, further comprising:

an outer surface, connected to the light-emitting surface and the light incidence surface, and comprising a first surface and a second surface, wherein the first surface is connected to the light-emitting surface and the second surface, the second surface is connected to the first surface and the light incidence surface, the first surface and the second surface have a first intersection, a maximum distance between the first intersection and the light incidence surface along the thickness direction is H4, and H4≤H2.

17. The converging lens as claimed in claim 16, wherein a section line of the first surface on a reference plane parallel to the thickness direction is an oblique line or an arc line, an included angle between the central axis and a tangent line of the section line is θ1, and $30° < \theta1 < 40°$.

18. The converging lens as claimed in claim 13, wherein the opening has a first side surface connected to the bottom surface, an included angle between the central axis and a section line of the first side surface on a reference plane parallel to the thickness direction is θ2, and $0° \leq \theta2 < 10°$.

19. The converging lens as claimed in claim 18, wherein the opening further has a second side surface, the second side surface is connected to the light-emitting surface and the first side surface, an included angle between the central axis and a section line of the second side surface on the reference plane is θ3, and $30° \leq \theta3 \leq 50°$.

20. The converging lens as claimed in claim 19, further comprising:

an outer surface, connected to the light-emitting surface and the light incidence surface, wherein the outer surface and the light-emitting surface have a second intersection, the light-emitting surface and the second side surface have a third intersection, the second side surface and the first side surface have a fourth intersection, a distance between the second intersection and the fourth intersection along a width direction perpendicular to the thickness direction is L3, a distance between the third intersection and the fourth intersection along the width direction is L4, and $0.3 \times L3 \leq L4 \leq 0.45 \times L3$.

* * * * *